United States Patent
Zhang et al.

(10) Patent No.: US 7,866,055 B2
(45) Date of Patent: Jan. 11, 2011

(54) LEVEL PROVIDED WITH IMPACT-ABSORBING END CAPS

(75) Inventors: Yuexiang Zhang, Nanjing (CN); Ming Chen, Nanjing (CN); Jianjun Shuang, Nanjing (CN)

(73) Assignee: Chervon Limited, Wanchai (HK)

( * ) Notice: Subject to any disclaimer, the term of this patent is extended or adjusted under 35 U.S.C. 154(b) by 11 days.

(21) Appl. No.: 12/459,656

(22) Filed: Jul. 6, 2009

(65) Prior Publication Data
US 2010/0000106 A1    Jan. 7, 2010

(30) Foreign Application Priority Data
Jul. 7, 2008    (CN) ................. 2008 2 0040764

(51) Int. Cl.
*G01C 9/02* (2006.01)
*G01C 9/00* (2006.01)
(52) U.S. Cl. ................. 33/365; 33/451; 33/350
(58) Field of Classification Search ........... 33/365, 33/451, 350
See application file for complete search history.

(56) References Cited

U.S. PATENT DOCUMENTS

| | | | | |
|---|---|---|---|---|
| 753,551 | A * | 3/1904 | Craven | 33/350 |
| 3,921,306 | A * | 11/1975 | Provi | 33/379 |
| 4,463,501 | A * | 8/1984 | Wright et al. | 33/350 |
| 5,709,034 | A * | 1/1998 | Kohner | 33/377 |
| 6,675,490 | B1 * | 1/2004 | Krehel et al. | 33/382 |
| 6,988,320 | B2 * | 1/2006 | Kallabis et al. | 33/365 |
| 7,073,270 | B2 * | 7/2006 | Kim | 33/451 |
| 7,552,540 | B2 * | 6/2009 | Ming | 33/347 |
| 2010/0000105 | A1 * | 1/2010 | Zhang et al. | 33/365 |

* cited by examiner

*Primary Examiner*—Christopher W Fulton
(74) *Attorney, Agent, or Firm*—McDermott Will & Emery LLP

(57) ABSTRACT

The present invention provides a level having a body which has a first end, a second end opposed to the first end, and a plane surface which connects the first and second ends, at least one level indicating device mounted to the body, and two end caps which are mounted onto the first and second ends, respectively. Each end cap has an outer end which is distributed by a plurality of resilient portions with small surface area for absorbing impact if the level is accidentally dropped or impacted.

10 Claims, 2 Drawing Sheets

LEVEL PROVIDED WITH IMPACT-ABSORBING END CAPS

CROSS-REFERENCE TO RELATED APPLICATIONS

This application claims priority under 35 U.S.C. 119 to CN 200820040764.3 filed Jul. 7, 2008, and is hereby incorporated by reference.

BACKGROUND OF THE INVENTION

The present invention relates to a level, particularly to a level provided with impact-absorbing end caps.

A typical level is widely used in construction, decorating and the like fields for helping to measure and assure that surfaces are horizontal, vertical or oblique to the horizon by a certain angle. The level generally comprises a main body, which has one plane surface, and bubble indicators mounted on the main body. Disadvantages with such levels are that the main body of the level may be easily damaged if accidentally dropped or impacted during use. In typical levels, two end caps are usually mounted one to each end of the main body of the level in order to absorb impact energy in dropping or impacting condition so as to decrease damage to the main body. This type of end cap is generally made of resilient material, such as plastic, rubber or the like. Traditionally, the simplest impact-absorbing end caps are directly formed through two ends of the main body being covered with resilient material, and the outer end surfaces of the end caps are formed as plane surfaces. However, the impact-absorbing performance of this kind of end cap may be inefficient. Many new impact-absorbing end caps, such as disclosed in U.S. Pat. No. 7,073,270, are developed for improvement, but have a complex structure which makes manufacture difficult and costly. The present invention overcomes current technical problems and provides a level with improved end caps with improved impact-absorbing performance.

SUMMARY OF THE INVENTION

The level of the present invention comprises a body having a first end, a second end opposed to the first end and a plane surface connecting the first and second ends, at least one level indicating device which is mounted to the body, a first end cap mounted onto the first end and a second end cap mounted onto the second end, respectively. Each end cap has an outer end which includes a plurality of resilient portions with small surface area.

According to the present invention, because a plurality of resilient portions each having a small surface area are designed to distribute on the outer end of the end cap, the end cap with resilient portions with a small surface area distorts more easily than a traditional end cap with a single resilient portion with large surface area when the level is accidentally dropped or impacted. When distortion of the end cap is larger, the impact force delivered to the body of the level is minimized. In this manner, the body of the level can be protected.

BRIEF DESCRIPTION OF THE DRAWINGS

The invention will be described in detail in conjunction with the accompanying drawings, wherein.

DETAILED DESCRIPTION

Figure 1:
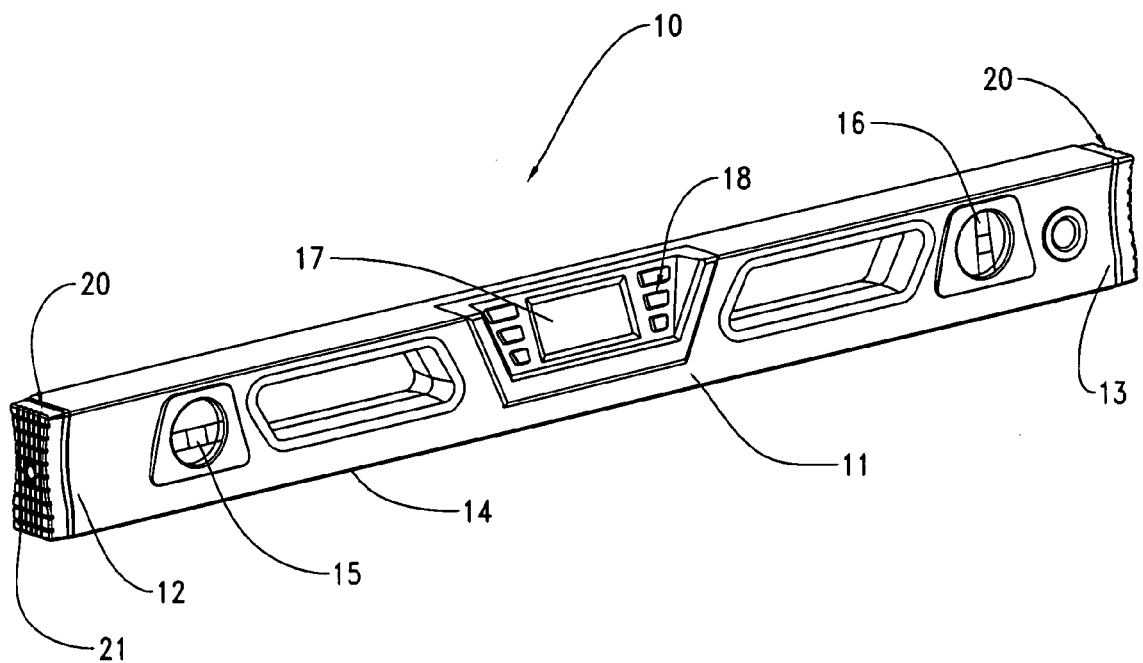
FIG. 1 is a perspective view of a level of a first embodiment according to the present invention.

FIG. 1 is a perspective view of a level 10 of a first embodiment according to the present invention. The level 10 comprises an elongate body 11 which has a first end 12, a second opposing end 13, and a plane surface 14 extending from the first end 12 to the second end 13 for contacting a surface to be measured to determine whether the surface is horizontal, or vertical, or oblique to the horizon by a certain angle. The level 10 further comprises a horizontal bubble indicator vial 15 and a vertical bubble indicator vial 16 both of which are mounted to the body 11. Preferably, the level 10 may be an electrical level with an inclinometer (not shown) mounted in the body for automatically measuring the inclined angle of the surface, an LCD (Liquid Crystal Display) screen 17 for numerically displaying the inclined angle which is measured by the inclinometer, and controlling keys 18 which are located beside the LCD screen 17 for measuring operation by users. In other embodiments, the level may comprise either a bubble vial (or bubble vials) or electrical level measuring and displaying device. Alternatively, the screen can be embodied to be an LED screen or the like.

Figure 2:
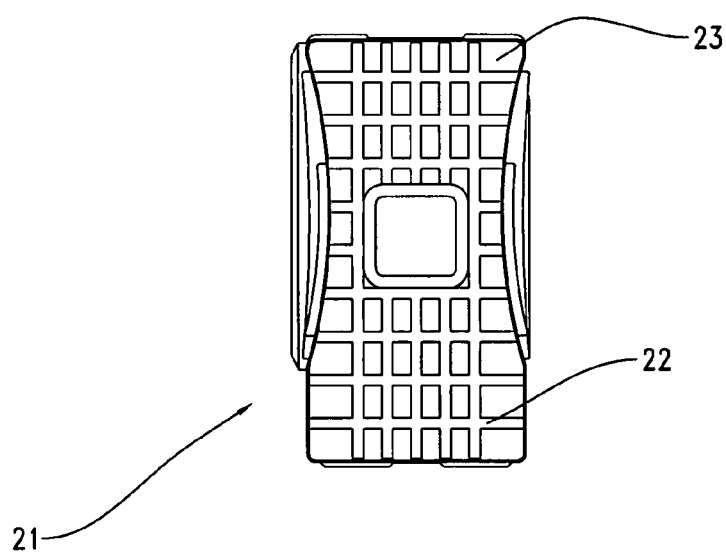
FIG. 2 is a left view of the level shown in FIG. 1.

A first end cap 20a and a second end cap 20b are fixed to the first end 12 and the second end 13, respectively, of the body 11 of the level through any suitable securing means including gluing, bolts or screws. The end caps 20a and 20b are generally made of resilient materials such as plastic or rubber. Each end cap has an outer end 21, including a plurality of recesses 22 formed therein running the length and width of the end cap, as shown in FIG. 2. The recesses 22 formed in length of the outer end 21 intersects the recesses 22 formed in width of the outer end 21 forming a plurality of raised or two-dimensional resilient portions 23 with small surface area.

Because each of the resilient portions 23 with small surface area may be distorted more easily than a resilient portion with a large surface area, the plurality of resilient portions 23 with small surface area are able to absorb more impact energy than a single resilient member with large surface area, thereby decreasing the impact force delivered to the body of the level. In this manner, the body of the level can be prevented from being damaged during use.

Figure 3:
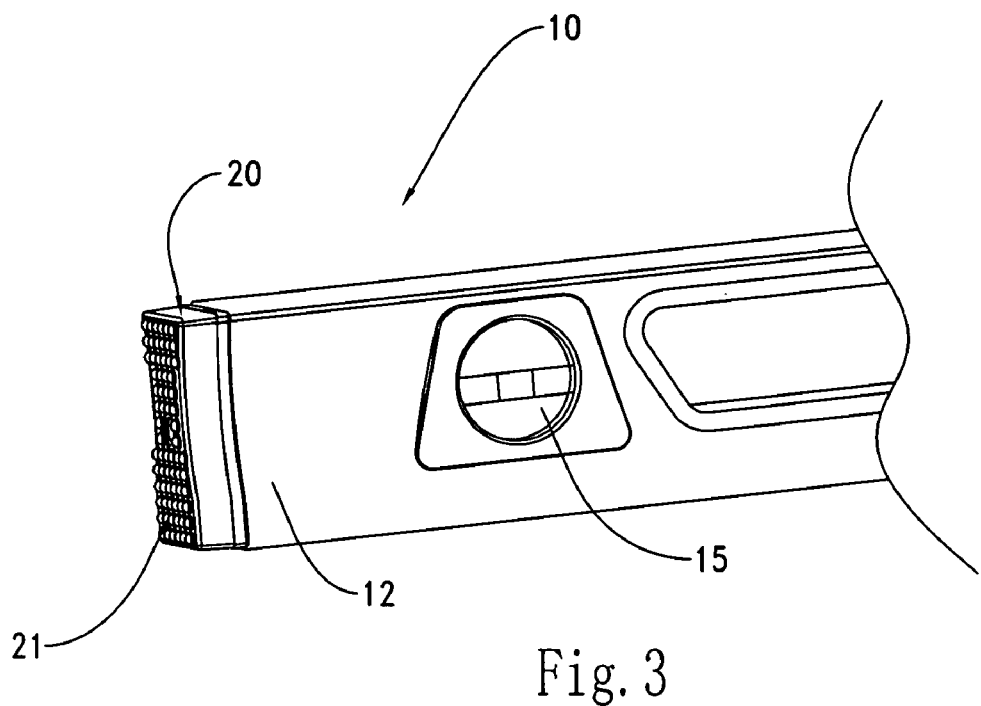
FIG. 3 is a perspective view of a level of a second embodiment according to the present invention.
Figure 4:
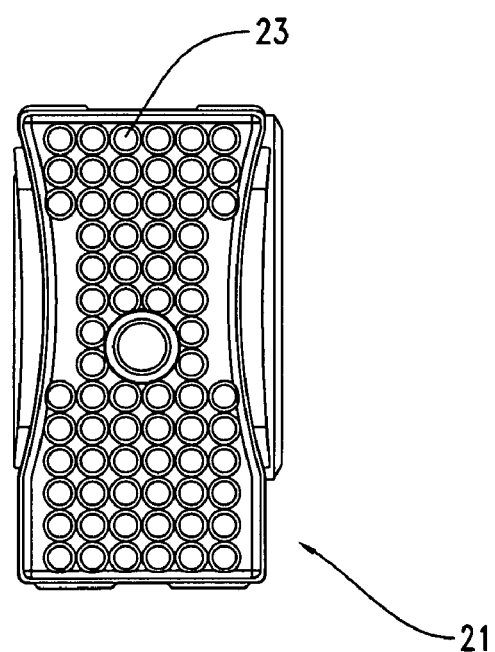
FIG. 4 is a left view of the level shown in FIG. 3.

In the present embodiment, the plurality of the resilient portions 23 with small surface area are constructed by intersecting of the recesses 22 formed in length and in width of the outer end 21 of the end cap 20, wherein the resilient portions 23 are directly formed on the outer end 21 and integrative with the outer end 21, and an outer surface of each resilient member 23 is planer. Those of ordinary skill in the art will easily understand that the manner of securing multiple resilient portions with small surface area onto the outer end of the end caps may be accomplished by any suitable manner including gluing or other securing means. Optionally, the outer surface of the resilient portions with small surface area may be any geometric shape, such as shown in FIGS. 3 and 4, wherein the resilient portions are formed having a spherical shape. Such plurality of resilient portions with small surface area can be arranged on the outer end of the end cap according to a variety of desired different patterns, which may either cover or partially cover the whole surface of the outer end of the end cap.

The above described preferred embodiments are intended to illuminate the principle of the present invention, but not to limit its scope. It can be easily understood for those ordinary skilled in the art that many other modifications and variations of these preferred embodiments will be apparent and may be made without departing from the spirit and the scope of the invention as defined in the following claims.

We claim:

1. A level comprising:
    a body having a first end, a second end opposed to the first end, and a plane surface connecting the first end and the second end;
    at least one level indicating device mounted to the body;
    a first impact-absorbing end cap mounted onto the first end and a second impact-absorbing end cap mounted onto the second end;
    each end cap having a plurality of resilient portions having a small surface area.

2. The level as claimed in claim 1, wherein an outer surface of each resilient portion is planer.

3. The level as claimed in claim 1, wherein an outer surface of each resilient portion is non-planer.

4. The level as claimed in claim 1, wherein the resilient portions are integrally formed on each end cap.

5. The level as claimed in claim 1, wherein the resilient portions are secured to the outer end.

6. A level comprising:
    an elongate body having a first end, a second end opposed to the first end, and a plane surface connecting the first end and the second end;
    at least one level indicating device mounted to the body;
    at least one end cap mounted to at least one of the first end and the second end; and,
    wherein the end cap includes multiple resilient portions having a small surface area and formed on an outer end of the end cap.

7. The level as claimed in claim 6, wherein an outer surface of each resilient portion is planer.

8. The level as claimed in claim 6, wherein an outer surface of each resilient portion is two-dimensional.

9. The level as claimed in claim 6, wherein the resilient portions are integrally formed on the outer end of the end cap.

10. The level as claimed in claim 6, wherein the resilient portions are secured to the outer end of the end cap.

* * * * *